United States Patent
Tononishi et al.

(10) Patent No.: US 9,537,133 B2
(45) Date of Patent: Jan. 3, 2017

(54) ELECTRIC STORAGE DEVICE AND POWER SOURCE MODULE

(71) Applicant: GS Yuasa International Ltd., Kyoto-shi (JP)

(72) Inventors: Masamitsu Tononishi, Kyoto (JP); Shogo Tsuruta, Kyoto (JP); Ryutaro Nishikawa, Kyoto (JP)

(73) Assignee: GS YUASA INTERNATIONAL LTD, Kyoto-Shi, Kyoto (JP)

( * ) Notice: Subject to any disclaimer, the term of this patent is extended or adjusted under 35 U.S.C. 154(b) by 367 days.

(21) Appl. No.: 13/951,245

(22) Filed: Jul. 25, 2013

(65) Prior Publication Data

US 2014/0030586 A1 Jan. 30, 2014

(30) Foreign Application Priority Data

Jul. 30, 2012 (JP) .................................. 2012-169017

(51) Int. Cl.
| | |
|---|---|
| *H01M 2/22* | (2006.01) |
| *H01M 2/06* | (2006.01) |
| *H01M 10/052* | (2010.01) |
| *H01M 10/058* | (2010.01) |

(52) U.S. Cl.
CPC ................. *H01M 2/22* (2013.01); *H01M 2/06* (2013.01); *H01M 10/052* (2013.01); *H01M 10/058* (2013.01)

(58) Field of Classification Search
CPC ............ H01M 2/22; H01M 2/06; H01M 2/26; H01M 2/30; H01M 10/052; H01M 10/058
See application file for complete search history.

(56) References Cited

U.S. PATENT DOCUMENTS

| | | |
|---|---|---|
| 2012/0214030 A1 | 8/2012 | Guen |
| 2012/0264007 A1 | 10/2012 | Sasaki et al. |
| 2013/0071728 A1* | 3/2013 | Shibanuma ......... H01M 2/0404 429/179 |

FOREIGN PATENT DOCUMENTS

| | | |
|---|---|---|
| JP | 2010-97822 A | 4/2010 |
| JP | 2011-233399 A | 11/2011 |
| JP | 2012-049077 A | 3/2012 |
| JP | 2012-174683 A | 9/2012 |
| JP | 2013-114924 A | 6/2013 |
| WO | WO 2011-135906 | * 11/2011 |
| WO | WO 2012/105491 A1 | 8/2012 |

OTHER PUBLICATIONS

U.S. Appl. No. 13/748,106—specification and figures.

* cited by examiner

*Primary Examiner* — Brittany Raymond
(74) *Attorney, Agent, or Firm* — McGinn IP Law Group, PLLC

(57) ABSTRACT

An electric storage device includes: a power generating element; a housing container that houses the power generating element; a connecting body electrically connected to the power generating element; and an insulating member that fits the housing container at a plurality of fitting portions, secures the connecting body, and insulates a conductive path, which includes the power generating element and the connecting body, and the housing container from each other.

20 Claims, 12 Drawing Sheets

ELECTRIC STORAGE DEVICE AND POWER SOURCE MODULE

CROSS-REFERENCE TO RELATED APPLICATION

This application is based on Japanese Patent Applications No. 2012-169017 filed with the Japan Patent Office on Jul. 30, 2012, the entire contents of which are hereby incorporated by reference.

FIELD

The present invention relates to an electric storage device and a power source module.

BACKGROUND

A secondary battery is used as a substitute for a primary battery. In addition, the secondary battery is in widespread use as a power source for an electronic device such as a mobile phone and an IT device. Especially, the nonaqueous electrolyte secondary cell typified by a lithium ion battery has a high energy density. Accordingly, application of the nonaqueous electrolyte secondary cell is being developed for a large industrial electrical machine such as an electric vehicle.

FIG. 12 is an exploded perspective view illustrating a schematic configuration of a related nonaqueous electrolyte secondary cell. This type of nonaqueous electrolyte secondary cell is described in, for example, JP-A-2010-097822. The nonaqueous electrolyte secondary cell 100 includes an exterior in a hexahedron shape. This exterior is constituted of a container main body 110 and a plate-shaped cover portion 120. The container main body 110 has a box shape with an opening. The opening of the container main body 110 is sealed by the cover portion 120. The material of the cover portion 120 is aluminum.

The cover portion 120 has an opening as a through-hole 120a for extracting a terminal. On an upper side of the through-hole 120a, an insulation sealing material 122 is positioned. The insulation sealing material 122 has an outline in a shape of an octagonal prism. The insulation sealing material 122 is a component made of insulating material. The insulation sealing material 122 includes a bottom surface 122b surrounded by the framing body 122a. On the bottom surface 122b, a through-hole 122c is formed. The through-hole 122c extends to the through-hole 120a of the cover portion 120. That is, the through-hole 122c communicates with through-hole 120a.

A connecting member 123 is a component made of conductive metal. At the center of the connecting member 123, a main body part 123a in a shape of an octagonal prism is positioned. Respective tubular portions 123b and 123c protrude from both surfaces of the main body part 123a. The main body part 123a fits the framing body 122a of the insulation sealing material 122. The tubular portion 123b is inserted into the through-hole 120a of the cover portion 120. This connects the tubular portion 123b to a current collector (not shown) housed inside of the container main body 110. The current collector is connected to a power generating element inside of the container main body 110.

A convex part 120b is formed on both ends of the cover portion 120 and at the outer side with respect to the through-hole 120a. The convex part 120b is a protrusion of the cover portion 120. The convex part 120b has a rectangular planar shape. Additionally, the convex part 120b is covered with a retainer 121, which is secured. The retainer 121 has a low-profile quadrangular prism shape. The retainer 121 is a component made of synthetic resin. The retainer 121 includes a backside surface (not shown) with a depression corresponding to the shape of the convex part 120b. Accordingly, the retainer 121 is secured on the cover portion 120 by fitting to the convex part 120b.

Additionally, a terminal member 125 is positioned on an upper side of the retainer 121. The terminal member 125 electrically connects the nonaqueous electrolyte secondary cell 100 to an external load or another battery. The terminal member 125 is a component made of high-strength conductive metal such as iron and stainless steel. The terminal member 125 includes a bolt portion 125a and a base portion 125b. The bolt portion 125a includes a surface with a thread. The base portion 125b is formed at a root portion of the bolt portion 125a. The base portion 125b has an outline in a quadrangular prism shape.

On a principal surface of the base portion 125b at a side facing the cover portion 120, a depressed part 125c is formed. The depressed part 125c has a shape corresponding to the shape of the retainer 121. The depressed part 125c fits the retainer 121. Accordingly, the terminal member 125 is secured to the cover portion 120 in a state insulated from the cover portion 120.

Additionally, a bridge member 124 is placed to cover both the connecting member 123 and the terminal member 125. The bridge member 124 includes a surface on which a through-hole 124a and a through-hole 124b are formed. The bridge member 124 is a plate-shaped component made of conductive metal. The tubular portion 123c of the connecting member 123 is inserted into the through-hole 124a. The bolt portion 125a of the terminal member 125 is inserted into the through-hole 124b. In this state, a distal end of the tubular portion 123c is swaged. Accordingly, the bridge member 124 is secured to the connecting member 123. This electrically connects the connecting member 123 and the terminal member 125 together.

In this nonaqueous electrolyte secondary cell 100, electricity stored inside of the container main body 110 is available through the terminal member 125. Specifically, wiring (not shown) of the external load is mounted on the bolt portion 125a of the terminal member 125, and fastened by a nut and similar member. This electrically connects the nonaqueous electrolyte secondary cell 100 and the external load together.

In the nonaqueous electrolyte secondary cell 100 as described above, the terminal member 125 is secured to the cover portion 120 via the insulative retainer 121 as illustrated in FIG. 12. In this case, rattling may occur between the retainer 121 made of insulative resin material and the convex part 120b of the cover portion 120 made of metallic material. Accordingly, in this technique, it is difficult to stably secure the terminal member 125 to the cover portion 120.

In an electric storage device like the nonaqueous electrolyte secondary cell 100, a conductive path that extends to the outside of the housing container from the power generating element connects to a connecting terminal like the terminal member 125 in a state insulated from the housing container by an insulation structure like the retainer 121. However, there has been a problem that it is difficult to stably secure this insulation structure to the housing container.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention has been made in view of the above circumstances. An object of the present invention is to provide an electric storage device that stably secures an insulation structure around a conductive path to a housing container.

An electric storage device according to a first aspect of the present invention includes: a power generating element; a housing container that houses the power generating element; a connecting body electrically connected to the power generating element; and an insulating member that fits the housing container at a plurality of fitting portions, secures the connecting body, and insulates a conductive path, which includes the power generating element and the connecting body, and the housing container from each other.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
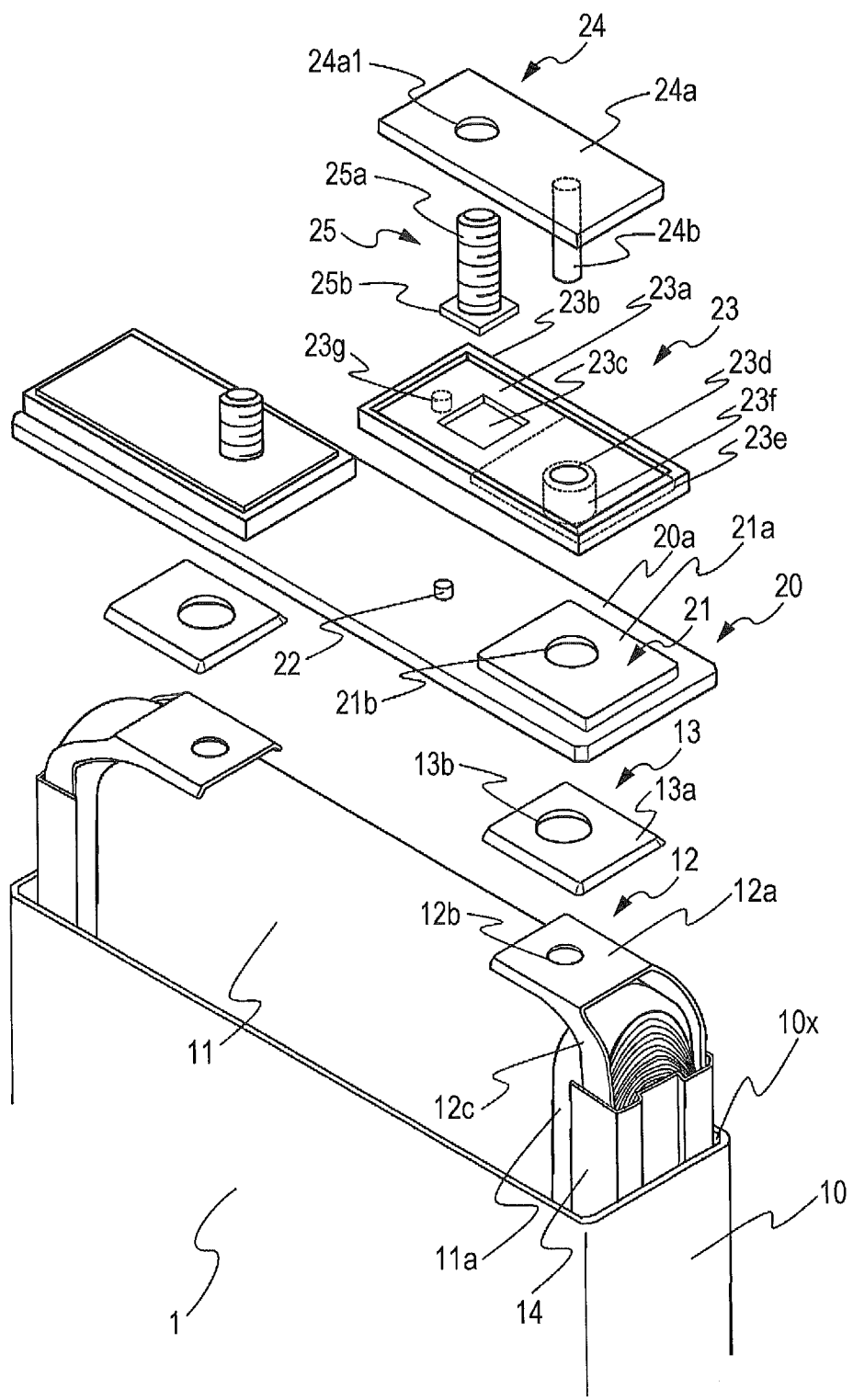
FIG. 1 is an exploded perspective view illustrating an example of a configuration of a nonaqueous electrolyte secondary cell according to one embodiment of the present invention.

An electric storage device according to a first aspect of the present invention includes: a power generating element; a housing container that houses the power generating element; a connecting body electrically connected to the power generating element; and an insulating member that fits the housing container at a plurality of fitting portions, secures the connecting body, and insulates a conductive path, which includes the power generating element and the connecting body, and the housing container from each other.

According to a second aspect of the present invention, in the electric storage device according to the first aspect of the present invention, the connecting body includes a terminal member for external connecting, and respective positions of the plurality of fitting portions in the insulating member are different from a securing position of the terminal member in the insulating member.

According to a third aspect of the present invention, in the electric storage device according to the first aspect of the present invention, the plurality of fitting portions is dispersed on quadrants positioned in a diagonal relationship in an orthogonal coordinate where the securing position of the terminal member is an origin.

According to a fourth aspect of the present invention, in the electric storage device according to the second aspect of the present invention, the plurality of fitting portions is dispersed on one coordinate axis in an orthogonal coordinate where the securing position of the terminal member is an origin, the plurality of fitting portions sandwiching the origin.

According to a fifth aspect of the present invention, in the electric storage device according to any one of the second to fourth aspects of the present invention, the plurality of fitting portions includes a first fitting portion and a second fitting portion, and a distance from the first fitting portion to the securing position of the terminal member is longer than a distance from the second fitting portion to the securing position of the terminal member.

According to a sixth aspect of the present invention, in the electric storage device according to the fifth aspect of the present invention, an outside dimension of the first fitting portion is larger than an outside dimension of the second fitting portion.

According to a seventh aspect of the present invention, in the electric storage device according to the sixth aspect of the present invention, the first fitting portion is positioned at an outer edge side with respect to the securing position of the terminal member, and the second fitting portion is positioned at an center side with respect to the securing position of the terminal member.

According to an eighth aspect of the present invention, in the electric storage device according to the second aspect of the present invention, the plurality of fitting portions includes two fitting portions that each form an angle with the securing position of the terminal member, the angle being within a range from 90° to 180°.

According to a ninth aspect of the present invention, in the electric storage device according to any one of the second to eighth aspects of the present invention, the plurality of fitting portions includes a fitting portion that has a flat planar shape, the planar shape having a longitudinal direction in a direction toward the securing position of the terminal member.

According to a tenth aspect of the present invention, the electric storage device according to the first aspect of the present invention further includes a current collector connected to the power generating element inside of the housing container. The connecting body further includes a relay member passing through a wall of the housing container to be connected to the current collector. The respective positions of the plurality of fitting portions are different from a connecting point between the relay member and the current collector.

According to an eleventh aspect of the present invention, the electric storage device according to any one of the second to ninth aspects of the present invention further includes a current collector connected to the power generating element inside of the housing container. The connecting body further includes a relay member passing through a wall of the housing container to be connected to the current collector. The terminal member is connected to the relay member and includes a shaft-like terminal main body. The terminal member is disposed on the insulating member while being exposed on a surface of the housing container. The securing position of the terminal member is a position of the terminal main body.

According to a twelfth aspect of the present invention, the electric storage device according to any one of the second to ninth aspects of the present invention further includes a current collector connected to the power generating element inside of the housing container. The connecting body further includes a relay member passing through a wall of the housing container to be connected to the current collector. The terminal member is connected to the relay member and includes a terminal main body in a plate shape along a surface of the housing container. The terminal main body is disposed on the insulating member while being exposed on a surface of the housing container. The relay member includes a shaft-like relay rod connected to the current collector at one end. The relay member is integrated with the terminal member. The securing position of the terminal member is a position of the relay rod.

According to a thirteenth aspect of the present invention, the electric storage device according to any one of the first to twelfth aspects of the present invention further includes: a convex part formed on a surface of the housing container; and a depressed part formed on a surface facing the convex part of the housing container in the insulating member, the depressed part having a shape corresponding to the convex part. At least one of the plurality of fitting portions is formed by fitting of the convex part of the housing container and the depressed part of the insulating member.

According to a fourteenth aspect of the present invention, the electric storage device according to any one of the first and thirteenth aspects of the present invention further includes: a depressed part formed on a surface of the housing container; and a convex part formed on a surface facing the depressed part of the housing container in the insulating member, the convex part having a shape corresponding to the depressed part. At least one of the plurality of fitting portions is formed by fitting of the depressed part of the housing container and the convex part of the insulating member.

According to a fifteenth aspect of the present invention, a power source module includes at least one electric storage device according to any one of the first to fourteenth aspects of the present invention.

According to the aspects of the present invention described above, the insulation structure around the conductive path in the housing container can be stably fitted and secured.

Hereinafter, an embodiment of the present invention will be described with reference to the drawings.

FIG. 1 is an exploded perspective view illustrating a schematic configuration of a nonaqueous electrolyte secondary cell 1 as an electric storage device according to an embodiment of the present invention.

As illustrated in FIG. 1, the nonaqueous electrolyte secondary cell 1 of this embodiment includes a housing container with an outline in a hexahedron shape as an exterior. The housing container includes a plate-shaped cover portion 20 and a box-shaped container main body 10. The material of the cover portion 20 is, for example, aluminum. The container main body 10 includes an opening 10x.

An electrode assembly 11 includes a positive electrode and a negative electrode that are strip-shaped electrodes and a strip-shaped separator sandwiched between these electrodes. The positive electrode and the negative electrode are wound in long cylindrical shapes via a separator. The positive electrode and the negative electrode are shifted from the separator in different directions along the winding axis. The positive electrode and the negative electrode protrude from the separator by respective predetermined widths on both ends of the electrode assembly 11. Additionally, an end portion of each electrode does not support the active material. Thus, a metal foil as a substrate is exposed at the end portion of each electrode.

An aluminum foil protruding (exposed) from the end portion of the electrode assembly 11 at the positive electrode is a positive electrode 11a. The positive electrode 11a connects to a current collector 12. The current collector 12 is a conductive metallic member.

A principal surface 12a is formed on one end of the current collector 12. The principal surface 12a has a plate shape that extends parallel to a surface of the electrode assembly 11. A through-hole 12b is formed on the principal surface 12a. The current collector 12 includes the other end where an arm portion 12c is formed. The arm portion 12c is curved toward a side surface of the electrode assembly 11. The arm portion 12c is sandwiched by a holding plate 14 together with the positive electrode 11a exposed at the side surface of the electrode assembly 11. The material of the holding plate 14 is metal such as aluminum. The arm portion 12c and the positive electrode 11a, which are sandwiched by the holding plate 14, are connected and secured to each other by ultrasonic welding or similar method. In the drawing, reference numerals are given only to the configuration at the positive electrode side. The electrode and the current collector at the negative electrode side also have the similar configuration. The substrate of the negative electrode is, for example, copper.

On both ends of the cover portion 20, a convex part 21 is raised from a surface 20a. The convex part 21 has a rectangular planar shape (cross-sectional shape). On an upper portion of the convex part 21, a planar surface 21a parallel to the surface 20a is formed. On the planar surface 21a, a through-hole 21b is opened. Closer the center of the cover portion 20 than the convex part 21, a convex part 22 is formed. The convex part 22 has an outline in a cylindrical shape.

An insulation sealing material 13 is disposed between the cover portion 20 and the current collector 12. The insulation sealing material 13 covers the principal surface 12a of the current collector 12. The material of the insulation sealing material 13 is, for example, synthetic resin. This synthetic resin has an insulation property and a certain degree of elasticity. The insulation sealing material 13 includes a principal surface 13a on which a through-hole 13b is formed. The through-hole 13b is formed concentrically with the through-hole 21b of the cover portion 20 and the through-hole 12b of the current collector 12.

An insulation sealing material 23 is positioned on an upper side of the cover portion 20. The convex part 21 and the convex part 22 of the cover portion 20 are covered with the insulation sealing material 23. The material of the insulation sealing material 23 is similar to that of the insulation sealing material 13, for example, insulating synthetic resin. The insulation sealing material 23 includes a principal surface 23a and a framing body 23b formed at the periphery of the principal surface 23a. On the principal surface 23a, a depressed part 23c and a through-hole 23d are formed. A terminal member 25 (described later) is placed on the depressed part 23c. The through-hole 23d is formed concentrically with the through-hole 21b of the cover portion 20. The principal surface 23a includes a backside surface facing the cover portion 20. On the backside surface of the principal surface 23a, a depressed part 23e is formed. The depressed part 23e has a shape corresponding to the convex part 21 of the cover portion 20. Additionally, in the depressed part 23e, a tubular portion 23f in communication with the through-hole 23d is formed. The tubular portion 23f has an outline corresponding to the through-holes 21b and 13b. The tubular portion 23f fits into the through-hole 21b and the through-hole 13b.

The terminal member 25 is placed within the depressed part 23c of the insulation sealing material 23. The terminal member 25 is a member for connecting the nonaqueous electrolyte secondary cell 1 to an external load or another battery, similarly to the terminal member 125 in the known example. The material of the terminal member 25 is high-strength conductive metal such as iron and stainless steel. The terminal member 25 includes a bolt portion 25a and a base portion 25b. The bolt portion 25a includes a surface where a thread is disposed. The base portion 25b is formed at a root portion of the bolt portion 25a. The base portion 25b has an outline in a quadrangular prism shape that fits the depressed part 23c.

The terminal member 25 is disposed at the depressed part 23c of the insulation sealing material 23. A relay member 24 is placed to cover the principal surface 23a of the insulation sealing material 23. The relay member 24 includes a plate-shaped bridge portion 24a and a relay rod 24b. In the bridge portion 24a, a through-hole 24a1 is opened. The material of the bridge portion 24a is, for example, conductive metal. The relay rod 24b has a cylindrical shape that protrudes toward the cover portion 20 side from the bridge portion 24a. The relay member 24 is disposed at the insulation sealing material 23 by fitting of the bridge portion 24a to the framing body 23b. In the relay member 24, the bridge portion 24a and the relay rod 24b may be constituted of the same material by, for example, forging and casting. The bridge portion 24a and the relay rod 24b may be constituted by integral molding with two separate materials of different types or the same type.

Figure 2:
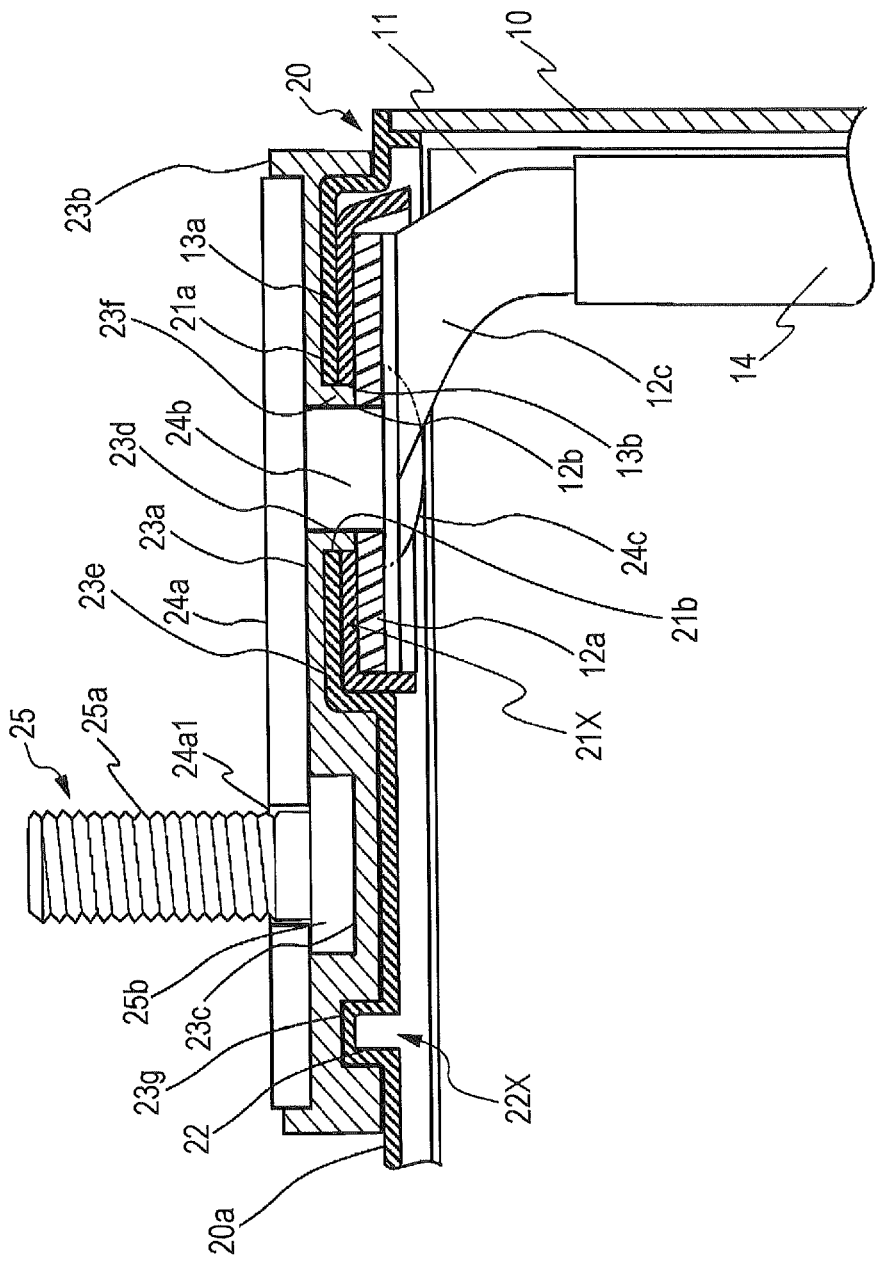
FIG. 2 is a cross-sectional view of a part illustrating the configuration of the nonaqueous electrolyte secondary cell.

Next, the configuration of the nonaqueous electrolyte secondary cell 1 of this embodiment will be described further in detail with reference to FIG. 2. FIG. 2 is a cross-sectional view of a main part illustrating a configuration from the insulation sealing material 23 and the terminal member 25 to the proximity of the current collector 12. FIG. 2 is a cross-sectional view of the main part of the assembled nonaqueous electrolyte secondary cell 1 taken along a plane that is parallel to a longitudinal direction of the cover portion 20 and parallel to an extending direction of the relay rod 24b of the relay member 24.

As illustrated in FIG. 2, the tubular portion 23f of the insulation sealing material 23 passes through the through-hole 21b of the cover portion 20 and the through-hole 13b of the insulation sealing material 13. The tubular portion 23f includes an end surface in contact with the principal surface 12a of the current collector 12 together with a backside surface of the insulation sealing material 13. The relay rod 24b of the relay member 24 passes through the through-hole 13b of the insulation sealing material 13 and the through-hole 12b of the current collector 12. In this state, a distal end of the relay rod 24b is swaged. The distal end of the relay rod 24b is shaped to have a swaged end 24c. The swaged end 24c has a larger outer diameter than an outer diameter of the through-hole 13b and an outer diameter of the through-hole 12b.

The insulation sealing material 23, the cover portion 20, the insulation sealing material 13, and the current collector 12 are sandwiched between the bridge portion 24a and the swaged end 24c of the relay member 24. This crimps and integrally secures the respective members. The base portion 25b of the terminal member 25 fits the depressed part 23c. The bolt portion 25a of the terminal member 25 is inserted into the through-hole 24a1 of the bridge portion 24a of the relay member 24. In this state, the terminal member 25 (the base portion 25b) is sandwiched between the insulation sealing material 23 and the bridge portion 24a to be secured.

In this configuration, the current collector 12 and the terminal member 25 are electrically connected together via the relay member 24. This forms a conductive path to take electricity stored in the electrode assembly 11 out of the cover portion 20.

Between the base portion 25b of the terminal member 25 and the cover portion 20, the depressed part 23c of the insulation sealing material 23 is positioned. The relay rod 24b of the relay member 24 includes a side surface that is covered with the tubular portion 23f of the insulation sealing material 23 and has contact with the cover portion 20. The insulation sealing material 13 is positioned between the principal surface 12a of the current collector 12 and the backside surface of the cover portion 20. With this configuration, the conductive path and the cover portion 20 are insulated from each other.

In the cover portion 20, the convex part 21 and the convex part 22 are formed by deforming the wall of the cover portion 20. That is, the shape of the convex part 21 is an inverted shape of a depression 21X on the backside surface of the cover portion 20. The shape of the convex part 22 is an inverted shape of a depression 22X on the backside surface of the cover portion 20. The convex part 21 fits a depressed part 23e of the insulation sealing material 23. The convex part 22 fits a depressed part 23g of the insulation sealing material 23.

In the above-described configuration, a combination of the container main body 10 and the cover portion 20 corresponds to a housing container of the present invention. The electrode assembly 11 corresponds to a power generating element of the present invention. The current collector 12, the terminal member 25, and the relay member 24 respectively correspond to a current collector, a terminal member, and a relay member of the present invention. A combination of the terminal member 25 and the relay member 24 corresponds to a connecting body of the present invention. The conductive path including the electrode assembly 11, the current collector 12, and the connecting body corresponds to a conductive path of the present invention. The insulation sealing material 23 corresponds to an insulating member of the present invention. The bolt portion 25a of the terminal member 25 corresponds to a terminal main body of the present invention. The relay rod 24b of the relay member 24 corresponds to a relay rod of the present invention. Additionally, the respective convex parts 21 and 22 of the cover portion 20 correspond to a convex part of the present invention. The respective depressed parts 23e and 23g of the insulation sealing material 23 correspond to a depressed part of the present invention.

The nonaqueous electrolyte secondary cell 1 of this embodiment includes the insulation sealing material 23 to secure (or place) the terminal member 25. The insulation sealing material 23 includes the depressed part 23e that fits the convex part 21 of the cover portion 20 and the depressed part 23g that fits the convex part 22 of the cover portion 20. The depressed part 23e and the depressed part 23g sandwich the bolt portion 25a of the terminal member 25 between them, and are disposed away from each other.

Hereinafter, a description will be given with reference to a plan view of a main part in FIG. 3. On the cover portion 20, the depressed part 23g, the terminal member 25, and the depressed part 23e, which includes the through-hole 23d into which the relay rod 24b of the relay member 24 is inserted, are disposed on the same straight line. The depressed part 23g is positioned closer to the center of the cover portion 20 than the bolt portion 25a. The depressed part 23e is positioned closer to an outer edge of the cover portion 20 than the bolt portion 25a. Therefore, the insulation sealing material 23 and the cover portion 20 fit each other in two fitting portions. That is, the convex part 21 of the cover portion 20 fits the depressed part 23e, and the convex part 22 of the cover portion 20 fits the depressed part 23g. This restricts movement of the insulation sealing material 23 on the cover portion 20.

Figure 12:
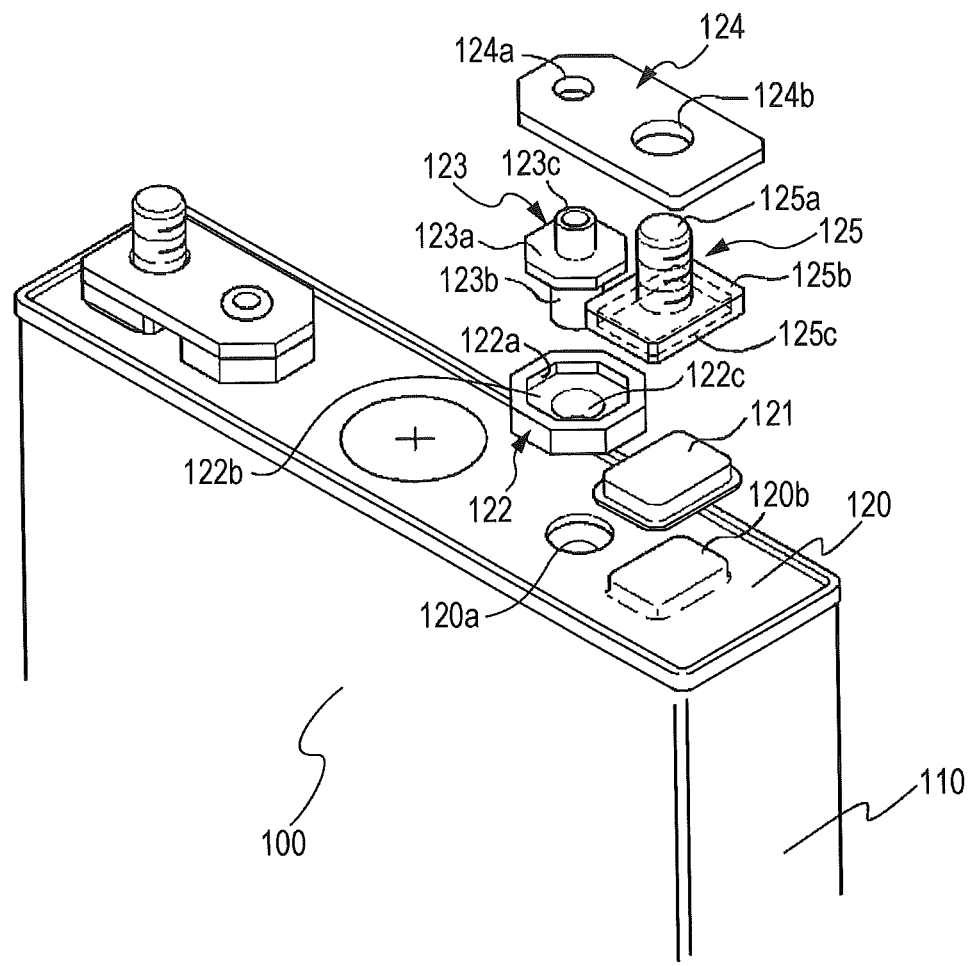
FIG. 12 is an exploded perspective view illustrating a configuration of a related nonaqueous electrolyte secondary cell.

This is based on the following reason. That is, in the known example illustrated in FIG. 12, rattling generated between the terminal member 125 and the cover portion 120 occurs based on inherent characteristics of manufacturing tolerances of the respective members. As an incidental cause, the raffling is considered to occur due to application of a torque around the bolt portion 125a or another load to the terminal member 25 when the terminal member 25 is connected to or separated from an external load or another battery.

On the other hand, the material of the retainer (convex part) 121 contains a synthetic resin material to insulate the terminal member 125 and the cover portion 120 from each other. The synthetic resin material has a smaller abrasion resistance and a smaller strength than those of the metallic material contained in the cover portion. This makes it difficult to accurately adjust the clearance between the terminal member and the insulating member.

Therefore, in the present invention, the cover portion 20 and the insulation sealing material 23 fit and are secured to each other in a plurality of positions at the periphery of the terminal member 25 as the center of turning of the insulation sealing material 23 that is one cause of the rattling. This reduces the rattling and stably secures the insulation sealing material 23 to the cover portion 20.

Figure 3:
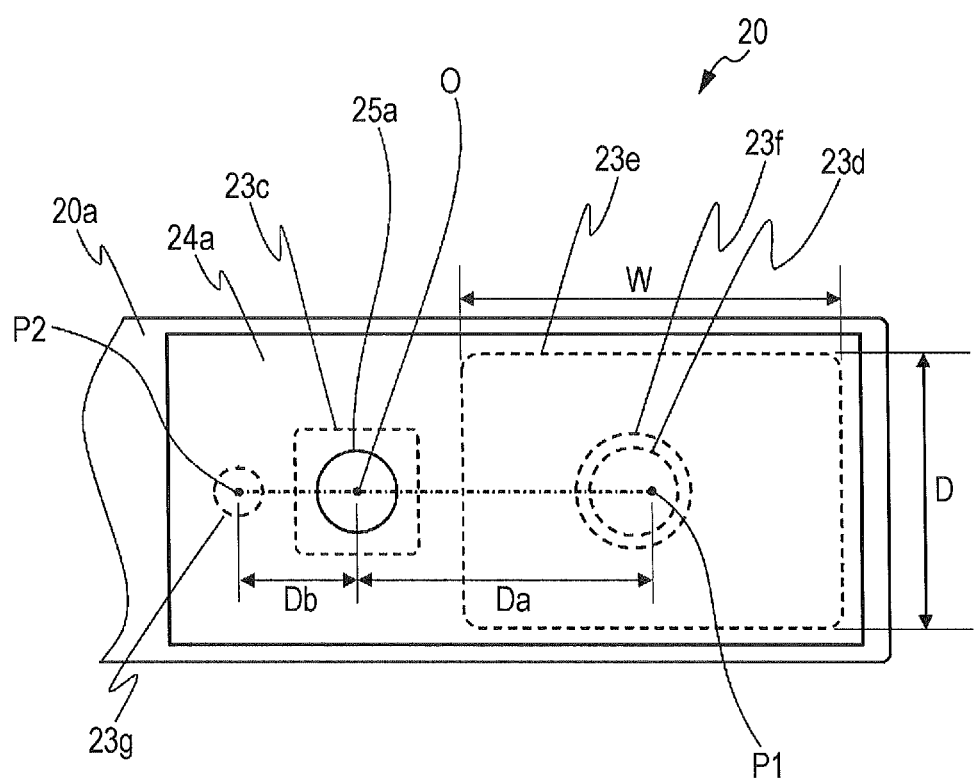
FIG. 3 is a plan view of the part illustrating the configuration of the nonaqueous electrolyte secondary cell.

That is, as illustrated in FIG. 3, the position (that is, the turning center of the insulation sealing material 23) of the bolt portion 25a is assumed to be a turning center O. This turning center O is a securing position of the terminal member 25 in the insulation sealing material 23. A fitting portion P1 by the depressed part 23e and a fitting portion P2 by the depressed part 23g are positioned away from the turning center (the origin) O in mutually opposite directions. Accordingly, the insulation sealing material 23 is secured to the cover portion 20 on two axes (in two positions). Thus, movement of the insulation sealing material 23 by rattling around one fitting portion is restricted by the other fitting portion. This consequently reduces the range of the movement of the entire insulation sealing material 23 due to the rattling.

The position of the fitting portion P1 corresponds to a barycentric position of the depressed part 23e on a planar surface. The position of the fitting portion P2 corresponds to a barycentric position of the depressed part 23g on a planar surface. Alternatively, the outlines of the depressed part 23e and the depressed part 23g or the outlines of the convex part 21 and the convex part 22 may be considered as the fitting portions.

Additionally, in this embodiment, the turning center O is away from a fitting position between the cover portion 20 and the insulation sealing material 23. A distance from the turning center O to the fitting portion P1 is assumed to be Da. A distance from the turning center O to the fitting portion P2 is assumed to be Db. A distance from the fitting portion P1 to the fitting portion P2 is assumed to be (Da+Db). In this embodiment, it is preferred that the distance (Da+Db) from the fitting portion P1 to the fitting portion P2 be set to be large.

Figure 4A:
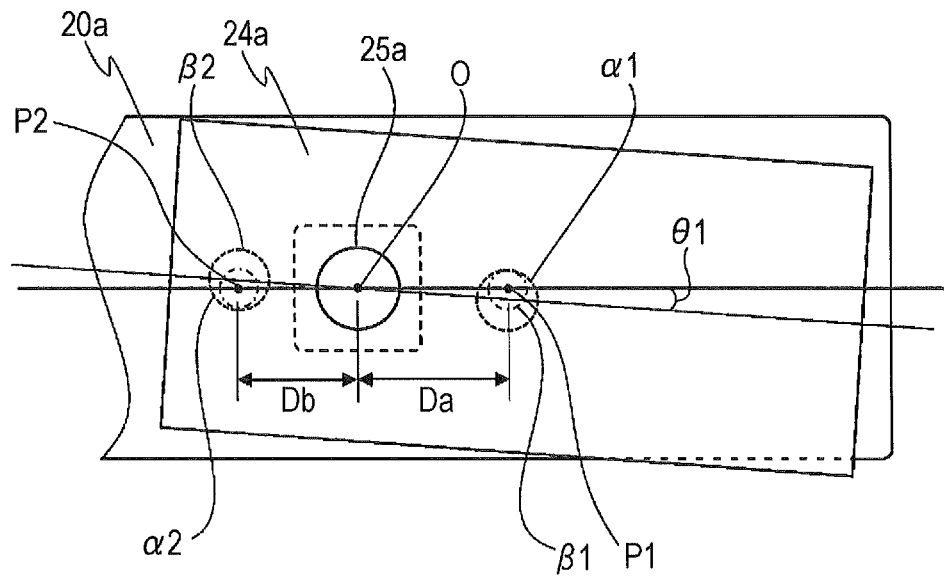
FIG. 4A and FIG. 4B are plan views of the part illustrating a principle of the present invention.

Setting the large distance from the fitting portion P1 to the fitting portion P2 has the following advantages. That is, as schematically illustrated in FIG. 4A, the insulation sealing material 23 is assumed to have depressed parts α1 and α2 with the same dimension. Additionally, the cover portion 20 is assumed to have a convex part β1 corresponding to the depressed part α1 and a convex part β2 corresponding to the depressed part α2. The depressed part α1 and the convex part β1 fit each other with a certain degree of clearance, and form the fitting portion P1. The depressed part α2 and the convex part β2 fit each other with a certain degree of clearance, and form the fitting portion β2.

In this case, the insulation sealing material 23 turns around the turning center O by a turning angle θ1 corresponding to the clearance between the fitting portions P1 and P2 and the distance from the fitting portion P1 to the fitting portion P2.

Figure 4B:
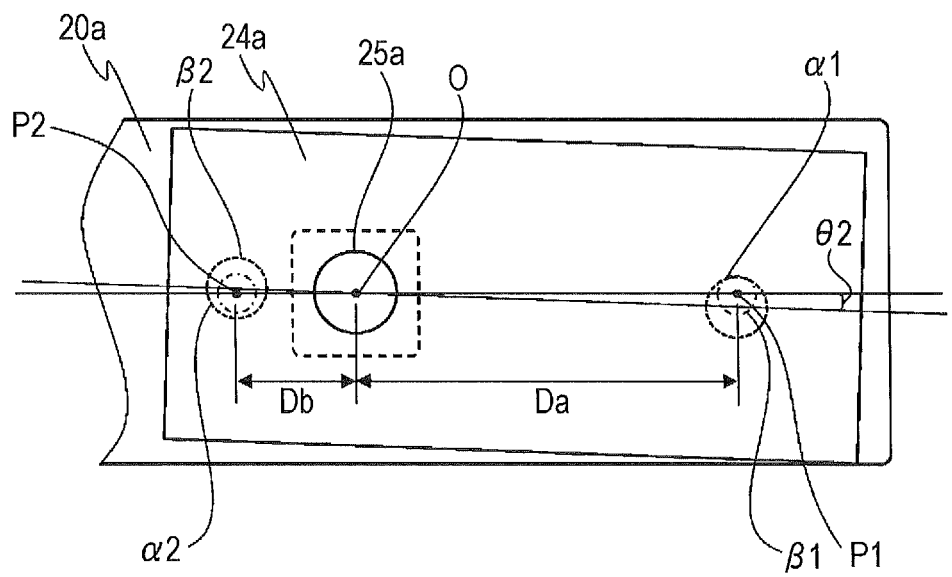

In contrast, setting the larger distance (Da+Db) from the fitting portion P1 to the fitting portion P2 as illustrated in FIG. 4B reduces the turning angle θ2 compared with the turning angle θ1.

Accordingly, setting the larger distance (Da+Db) from the fitting portion P1 to the fitting portion P2 reduces a rotation angle of the rotation around the turning center O as a part of the movement that causes rattling. This reduces the influence of the individual clearances in the fitting portions. As a result, this further reduces the range of the movement of the entire insulation sealing material 23.

Additionally, in this embodiment, the nonaqueous electrolyte secondary cell 1 has the distance Da between the turning center O and the fitting portion P1 (a first fitting portion) and the distance Db between the turning center O and the fitting portion P2 (a second fitting portion) that are different from each other. That is, a relationship of Da>Db is set between the distance Da and the distance Db.

As described above, in the respective fitting portions P1 and P2, the depressed part at the insulation sealing material 23 fits the convex part at the cover portion 20 with a certain degree of clearance. In this case, setting the relationship of Da>Db as illustrated in FIG. 4B restricts movement around the fitting portion due to rattling in the fitting portion P1. This reduces the turning angle compared with the case of Da=Db. As a result, this further reduces the range of the movement of the entire insulation sealing material 23. This further reduces rattling caused by the turning of the insulation sealing material 23 around the turning center O (the bolt portion 25a) when, for example, the bolt portion 25a is fastened with a nut.

Additionally, in this embodiment, a flat dimension (a flat dimension of the fitting portion P1) of the depressed part 23*e* at the larger distance Da side is larger than a flat dimension (a flat dimension of the fitting portion P2) of the depressed part 23*g* at the smaller distance Db side. This provides a comparatively even balance (balance of impact) of resistance to the turning around the bolt portion 25*a* in the insulation sealing material 23 between the depressed part 23*e* side and the depressed part 23*g* side. This reduces rotation of the insulation sealing material 23 around the bolt portion 25*a* when an external force such as a vibration and an impact is applied to the nonaqueous electrolyte secondary cell 1.

Additionally, in this embodiment, the depressed part 23*e* in the fitting portion P1 has a rectangular planar shape as illustrated in FIG. 3. In the depressed part 23*e*, a dimension W that coincides with the longitudinal direction of the cover portion 20 is larger than a dimension D in a short direction. This allows setting a large contact portion between the depressed part 23*e* and the convex part 21 in a tangential direction of the turning center O. As a result, this further reduces rattling in the fitting portion P1.

The positional relationship between the turning center O and the respective fitting portions P1 and P2 has been described with an example of arrangement on the cover portion 20. However, the above-described positional relationship is determined by a relationship between the turning center O and the respective fitting portions P1 and P2. Therefore, the positional relationship is satisfied regardless of the outline of the cover portion 20 and the respective positions of elements of the cover portion 20 unrelated to the positional relationship.

In this embodiment, the terminal member 25 and the relay rod 24*b* are disposed along the longitudinal direction of the cover portion 20 on the cover portion 20 with a rectangular outline. Furthermore, the depressed part 23*e* passing through the relay rod 24*b* is disposed closer to the outside edge than the bolt portion 25*a* in the cover portion 20. This provides a shorter distance from the current collector 12 to the relay rod 24*b* inside of the nonaqueous electrolyte secondary cell 1. This reduces a moment load acting on the relay rod 24*b* by a weight of the electrode assembly 11. A large moment load loosens swaging of the relay rod 24*b*. This may break the airtightness of the housing container. Therefore, the configuration of this embodiment is preferred to reduce the moment load.

Accordingly, in the nonaqueous electrolyte secondary cell 1 of this embodiment, the two fitting portions between the insulation sealing material 23 and the cover portion 20, that is, the fitting portion P1 between the convex part 21 and the depressed part 23*e* and the fitting portion P2 between the convex part 22 and the depressed part 23*g* sandwich the bolt portion 25*a* of the terminal member 25 between them and are away from each other. This reduces rattling of the insulation sealing material 23. As a result, this stably secures the insulation sealing material 23 to the housing container.

In the above description, the fitting portions P1 and P2 and the turning center O as the bolt portion 25*a* of the terminal member 25 are disposed on the same straight line. However, positions of these portions are not limited to these positions. That is, in this embodiment, the cover portion 20 and the insulation sealing material 23 are fitted and secured to each other in a plurality of portions as described above. Additionally, the position of the bolt portion 25*a* is separated from the plurality of fitting positions between the cover portion 20 and the insulation sealing material 23. This reduces rattling generated in the insulation sealing material 23 in this embodiment.

Figure 5:
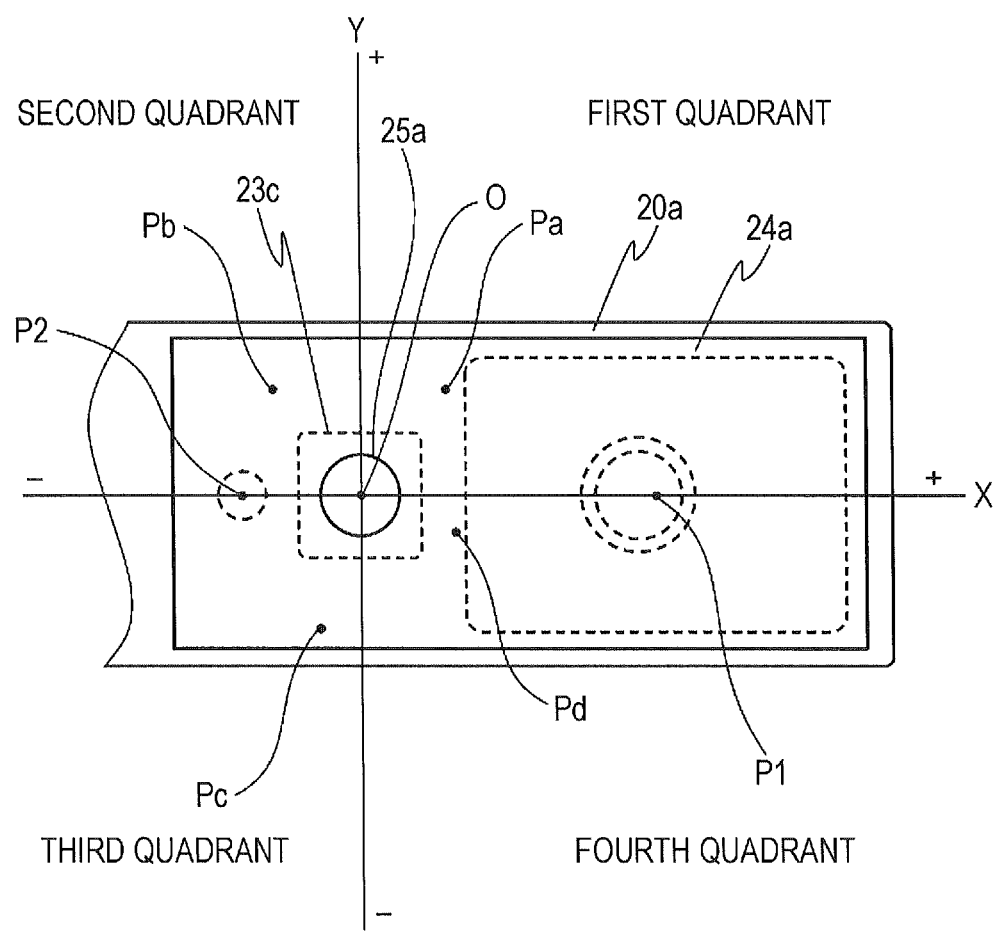
FIG. 5 is a plan view of the part illustrating the principle of the present invention.

For example, the position of the bolt portion 25*a* and the plurality of fitting positions between the cover portion 20 and the insulation sealing material 23 may have a relationship illustrated in FIG. 5. In FIG. 5, an X-Y coordinate (an orthogonal coordinate) is set with the turning center O as the origin on the cover portion 20. The plurality of fitting positions between the cover portion 20 and the insulation sealing material 23 may be disposed in any position on the X-Y plane except the turning center O.

It is preferred that the plurality of fitting portions between the cover portion 20 and the insulation sealing material 23 be disposed across a plurality of quadrants in a diagonal relationship in FIG. 5. For example, the fitting portion is preferred to include a fitting portion Pa positioned in a first quadrant of the X-Y coordinate and a fitting portion Pc positioned in a third quadrant. The fitting portion is preferred to include a fitting portion Pb positioned in a second quadrant and a fitting portion Pd positioned in a fourth quadrant.

In this arrangement, an angle formed by the turning center O and two fitting portions (connecting portions) is equal to or more than 90°. Accordingly, a distance between the two fitting portions can be set larger than a distance from the fitting portions to the turning center O. Furthermore, the rattling has a different moving direction for each fitting portion. More simply, this reduces rattling caused by turning of the insulation sealing material 23 around the turning center O.

For the same reason, the plurality of fitting portions is preferred to be dispersed on the X axis or the Y axis of the X-Y coordinate. In the case where the fitting portions are dispersed on the X axis, the arrangement of the fitting portions approximately coincides with the arrangement illustrated in FIG. 3. In this case, the angle formed by the turning center O and the two fitting portions has the maximum value of 180°.

Figure 6A:
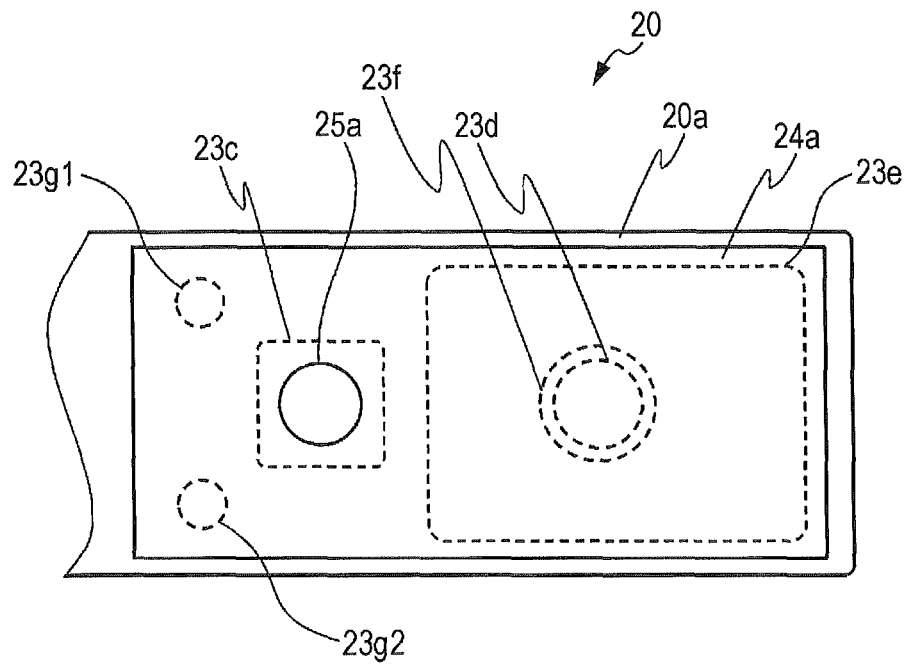
FIG. 6A and FIG. 6B are plan views of a part illustrating another example of the configuration of the nonaqueous electrolyte secondary cell.

In an example illustrated in FIG. 6A, depressed parts 23*g*1 and 23*g*2 are disposed close to the center in the cover portion 20. Accordingly, three or more fitting portions may be disposed. A positional relationship between a depressed part 23*g*1 and the depressed part 23*e* or a positional relationship between a depressed part 23*g*2 and the depressed part 23*e* satisfies the relationship illustrated in FIG. 5.

Figure 6B:
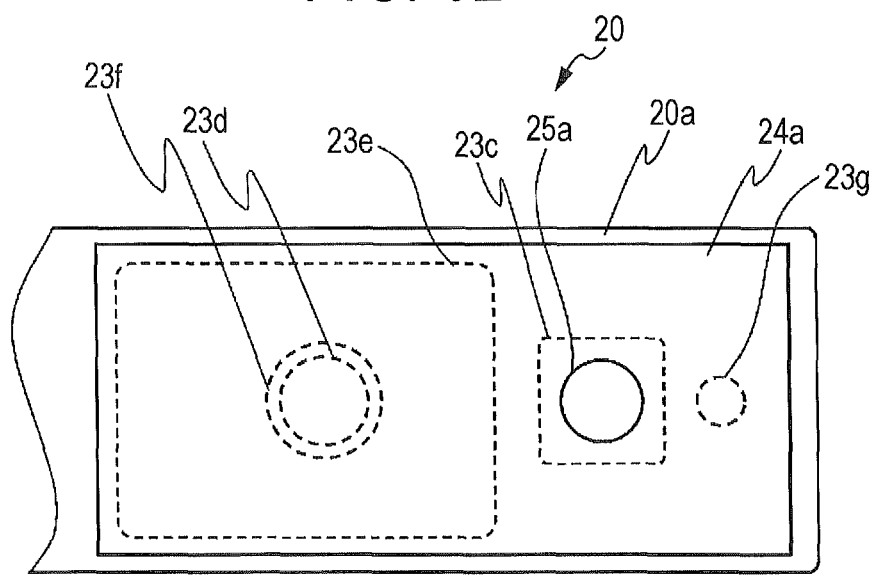

Further, as illustrated in FIG. 6B, respective positions of the depressed part 23*e* and the depressed part 23*g* with respect to the bolt portion 25*a* may be switched from the example illustrated in FIG. 3. The bolt portion 25*a*, the depressed part 23*e*, and the depressed part 23*g* are disposed on the same straight line and satisfy the relationship illustrated in FIG. 5.

In the X-Y coordinate exemplarily illustrated in FIG. 5, the longitudinal direction and the short direction of the cover portion 20 with the rectangular outline respectively correspond to the X axis and the Y axis. However, the X-Y coordinate may be set with any rotation angle around the turning center O. That is, the bolt portion 25*a*, the depressed part 23*e*, and the depressed part 23*g* may be laid out regardless of the shape of the cover portion 20. The bolt portion 25*a* and the depressed parts 23*e* and 23*g* are preferred to be laid out such that respective angles formed by the turning center O and arbitrarily selected two connecting portions (positions of the depressed part 23*e* and the depressed part 23*g*) become equal to or more than approximately 90° and equal to or less than approximately 180°.

This simply reduces rattling caused by turning of the insulation sealing material 23 around the turning center O.

The arrangement of the bolt portion 25a and the depressed parts 23e and 23g is not necessarily limited by the arrangement based on the X-Y coordinate. That is, the turning center O corresponding to the bolt portion 25a and the plurality of fitting portions corresponding to the depressed part 23e and the depressed part 23g are preferred to be disposed to have a positional relationship where the plurality of fitting portions restricts turning of the insulation sealing material 23 around the turning center O. This reduces rattling of the insulation sealing material 23.

Accordingly, the plurality of fitting portions is simply dispersed such that the plurality of fitting portions is not considered to form one fitting portion. That is, any configuration is possible as long as the plurality of fitting portions is dispersed to the extent that respective directions of receiving the forces that generate rattling differ from one another.

In the case of layout with the X-Y coordinate, a subtle difference when the fitting portions are disposed, an error during assembly of the battery, or a tolerance of dimension for each component in each quadrant or each coordinate axis is included within the scope of the present invention. Similarly, the subtle difference, the error, or the tolerance may cause a numerical error in the respective angles formed by the turning center O and the two fitting portions. For example, the respective angles formed by the turning center O and the two fitting portions may be equal to or less than 90° (for example, approximately few degrees to 10° and less than 90°). This error is within an allowable range (equal to or more than approximately 90° and equal to or less than approximately 180°) of the angle of the present invention.

In the example illustrated in FIG. 3, as described above, the bolt portion 25a, the depressed part 23e, and the depressed part 23g are disposed on the same straight line. Furthermore, the turning center O of the depressed part 23e and the depressed part 23g and each fitting portion form an angle (a first angle) of 180°. In this embodiment, the first angle of 180° means that the turning center O and the two fitting portions are arranged on the same straight line. In this embodiment, the angle of approximately 180° is an angle equivalent to 180°. That is, the first angle of approximately 180° means that the turning center O and the two fitting portions are arranged on approximately the same straight line and the respective portions are arranged within the above-described subtle difference. The depressed part 23e and the depressed part 23g each have a specific shape of the fitting portion. In the case where the first angle is approximately 180°, a part of the bolt portion 25a including the turning center O, a part of the depressed part 23e, and a part of the depressed part 23g are disposed on the same straight line or arranged to the extent that these parts are adjacent to the same straight line.

Additionally, in the above-described description, the depressed part 23e is formed to include the insertion position (the through-hole 23d) of the relay rod 24b of the relay member 24 in a plan view of the cover portion 20. However, the position of the fitting portion and the position of the relay member that connects the power generating element and the current collector together do not necessarily overlap each other.

Figure 7A:
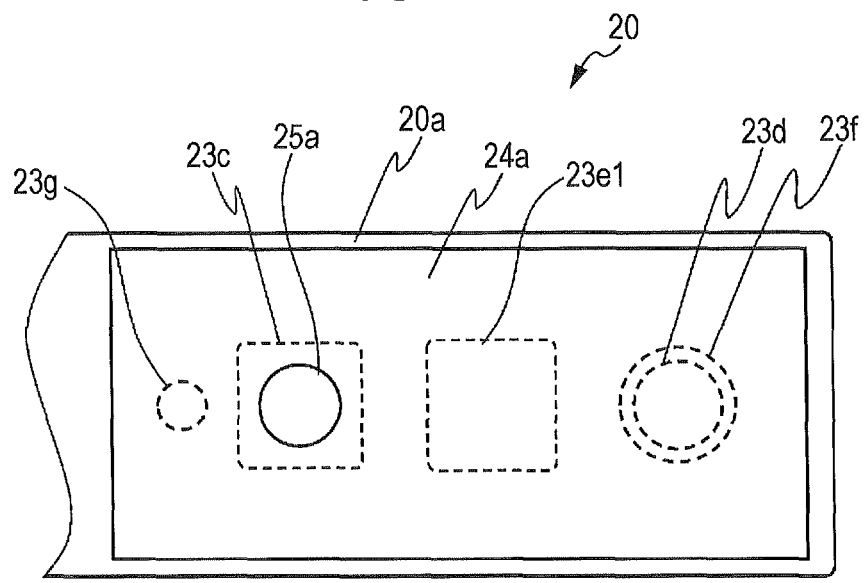
FIG. 7A and FIG. 7B are plan views of a part illustrating another example of the configuration of the nonaqueous electrolyte secondary cell.
Figure 7B:
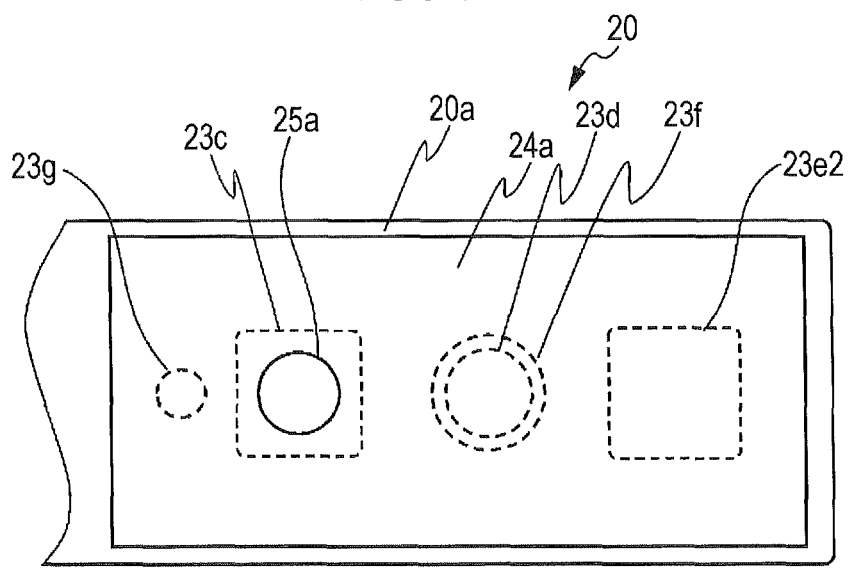

Accordingly, like the example illustrated in FIG. 7A, the depressed part 23e1 may be closer to the center than the relay rod 24b in the cover portion 20. Alternatively, like the example illustrated in FIG. 7B, the depressed part 23e2 may be closer to the outer edge than the relay rod 24b in the cover portion 20. Especially, in the example illustrated in FIG. 7B, the distance (the distance between the fitting portions) between the depressed part 23e2 and the depressed part 23g, and the distance between the bolt portion 25a and the depressed part 23e2 may be set to be large. Thus, the example illustrated in FIG. 7B is preferred.

In this embodiment, the depressed part of the insulation sealing material 23 has a circular planar shape (cross-sectional shape) like the depressed part 23g or a rectangular planar shape (cross-sectional shape) like the depressed part 23e. However, the depressed part may have any shape. In examples illustrated in FIG. 7A and FIG. 7B, the depressed parts 23e1 and 23e2 each have a square planar shape.

Additionally, in this embodiment, the depressed part 23e of the insulation sealing material 23 has a rectangular shape that has a long side in a direction along the longitudinal direction of the cover portion 20. However, the depressed part of the insulation sealing material 23 do not necessarily correspond to the shape of the cover portion 20 as the principal surface of the housing container. In an example illustrated in FIG. 8, the depressed parts 23e3 and 23e4 each have a rectangular shape with a side inclined to the longitudinal direction of the cover portion 20.

Figure 8:
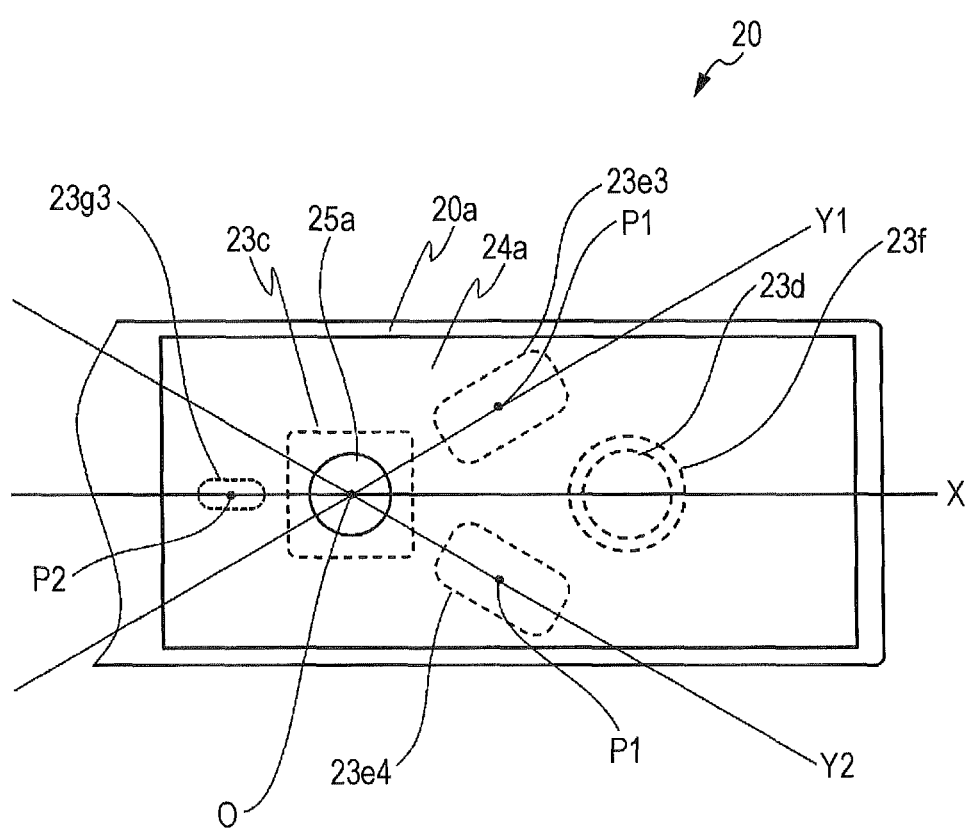
FIG. 8 is a plan view of a part illustrating another example of the configuration of the nonaqueous electrolyte secondary cell.

In the example illustrated in FIG. 8, the respective shapes of the depressed parts 23e3 and 23e4 are determined based on a relationship between the depressed parts 23e3 and 23e4 and the turning center O on the bolt portion 25a. This relationship contributes to rattling of the insulation sealing material 23. The depressed parts 23e3 and 23e4 each have a rectangular shape. A longitudinal direction of this rectangular shape extends along coordinate axes Y1 and Y2 on a coordinate system where the coordinate axis Y is rotated around the turning center O in the X-Y coordinate system illustrated in FIG. 5. All the coordinate axis Y and the coordinate axes Y1 and Y2 correspond to a radial direction of the turning center O. Therefore, the depressed parts 23e3 and 23e4 may each have a flat shape where a longitudinal direction corresponds to this radial direction. This maintains the effect for reducing rattling in the fitting portion P1 similarly to the example illustrated in FIG. 3.

A depressed part 23g3 illustrated in FIG. 8 is a modification of the depressed part 23g that has an oval planar shape. This depressed part 23g3 also provides an effect similar to that of the depressed parts 23e3 and 23e4.

Additionally, in this embodiment, the connecting body of the nonaqueous electrolyte secondary cell 1 includes the terminal member 25 with the bolt portion 25a and the relay member 24. However, the connecting body of the nonaqueous electrolyte secondary cell 1 does not necessarily include the bolt portion 25a.

Figure 9:
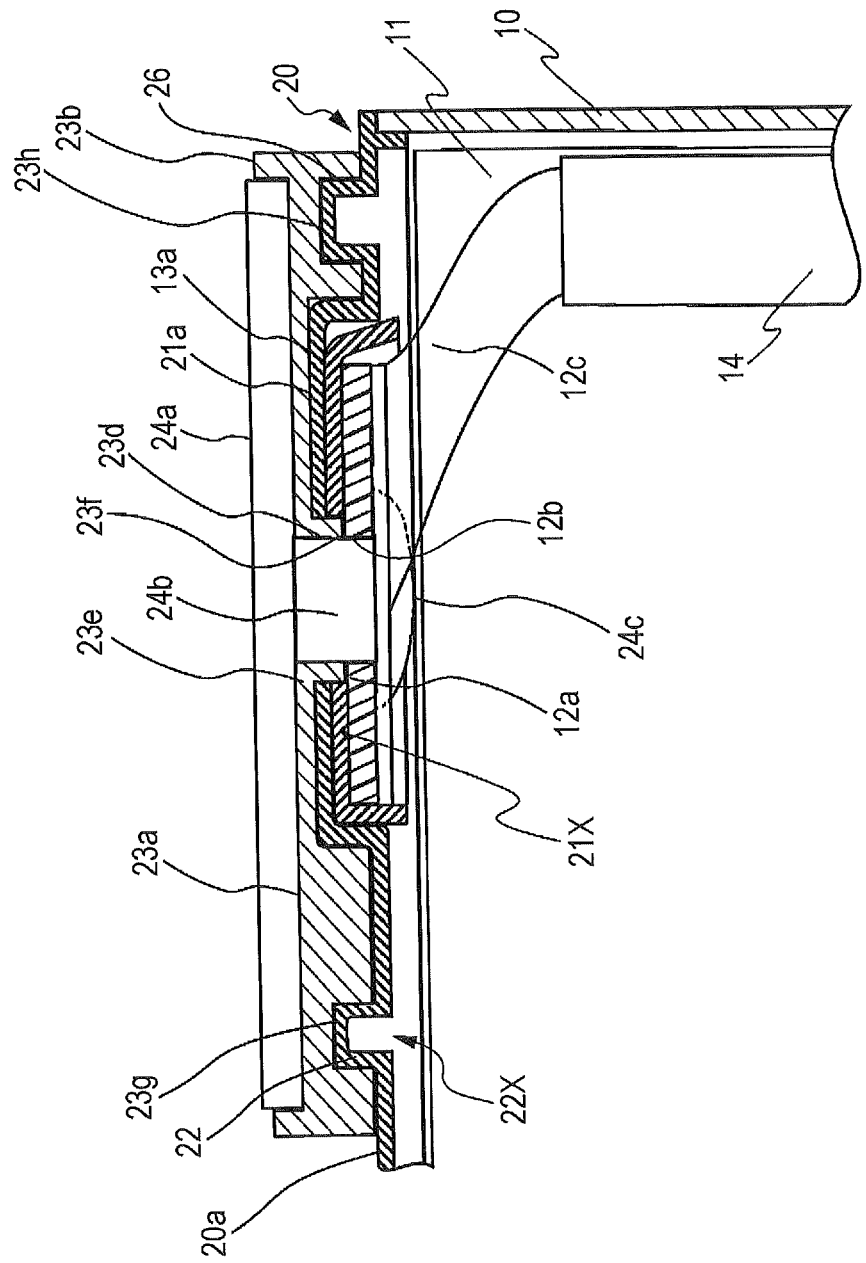
FIG. 9 is a cross-sectional view of a part illustrating another example of the configuration of the nonaqueous electrolyte secondary cell.

In an example illustrated in FIG. 9, the terminal member 25 is not disposed. Therefore, in this example, the bridge portion 24a does not include the through-hole 24a1. A surface of the bridge portion 24a is directly connected to wiring from an external load by welding or similar method. In this example, the bridge portion 24a functions as a welding terminal (the terminal member of the connecting body). Since the terminal member 25 is not included, the insulation sealing material 23 does not include the depressed part 23c. Furthermore, a depressed part 23h is disposed between the tubular portion 23f and the framing body 23b. The cover portion 20 includes a convex part 26 in a shape corresponding to the depressed part 23h. Accordingly, the depressed part 23h and the convex part 26 form a fitting portion.

In this configuration, the insulation sealing material 23 is secured to the cover portion 20 at two portions of the fitting portion between the depressed part 23g and the convex part 22 and the fitting portion between the depressed part 23h and the convex part 26. The relay rod 24b of the relay member 24 is positioned between these fitting portions. The position of this relay rod 24b becomes a securing position of the terminal member (the bridge portion 24a) in the insulation sealing material 23. Similarly to the configuration illustrated in FIG. 3, the respective fitting portions and the relay rod 24b are arranged on the same straight line on a planar surface.

Accordingly, the insulation sealing material 23 and the relay member 24, which functions as the connecting body, are directly secured to each other in the position (the securing position) of the relay rod 24b. The position of the relay rod 24b becomes the turning center O illustrated in FIGS. 4A and 4B. This reduces rattling of the insulation sealing material 23 similarly to the above-described embodiment.

Especially, in the example illustrated in FIG. 9, the relay rod 24b is connected to the current collector 12. This reduces rattling caused by turning of the insulation sealing material 23 around the relay rod 24b in the case where an external force such as a vibration is applied to the housing container also during single use, storage, or similar use of the nonaqueous electrolyte secondary cell 1.

Additionally, for example, in the case where the nonaqueous electrolyte secondary cell 1 is used as a power source module, a busbar is bonded to the bridge portion 24a by welding. In this case, for example, a vibration and an impact may be transmitted directly to the relay rod 24b or the current collector 12 through the busbar during use of the module. At this time, if a large rattling is generated in the fitting portion between the insulation sealing material 23 and the cover portion 20, an unnecessary stress generated by, for example, a vibration or an impact is applied to the busbar, the relay member (a relay terminal) 24, and similar member. This may deteriorate a welded portion and an airtight portion of the insulation sealing material 23. However, the example illustrated in FIG. 9 reduces this rattling and reduces a negative effect of this rattling.

In the example illustrated in FIG. 9, the relay member 24 corresponds to a relay member integrated with the terminal member of the nonaqueous electrolyte secondary cell 1. The bridge portion 24a corresponds to a plate-shaped terminal main body of the nonaqueous electrolyte secondary cell 1.

In the example illustrated in FIG. 9, the turning center O corresponds to the position of the relay rod 24b. In this respect, the respective depressed parts may be disposed assuming that the turning center O coincides with the position of the relay rod 24b also in the example with the bolt portion 25a illustrated in FIG. 3 for example.

In this embodiment, the insulation sealing material 23 includes the principal surface 23a and the tubular portion 23f. On the principal surface 23a, the bridge portion 24a of the relay member 24 and the base portion 25b of the terminal member 25 are placed. The tubular portion 23f covers a side surface of the relay rod 24b of the relay member 24. However, the insulation sealing material of the nonaqueous electrolyte secondary cell 1 simply insulates the conductive path, which is formed from the current collector onto the container main body, from the cover portion 20. Therefore, the specific shape of the insulation sealing material is not limited.

In this embodiment, the cover portion 20 includes the convex parts 21 and 22 while the insulation sealing material 23 includes the depressed parts 23e and 23g corresponding to these convex parts. Accordingly, in the nonaqueous electrolyte secondary cell 1, all of the plurality of fitting portions may protrude in the same direction. Alternatively, a part of the plurality of fitting portions may protrude in a different direction from a direction of other fitting portions. The direction of fitting is not limited. Therefore, the cover portion 20 may include a depressed part while the insulation sealing material includes a convex part (for example, see FIG. 10).

Figure 10:
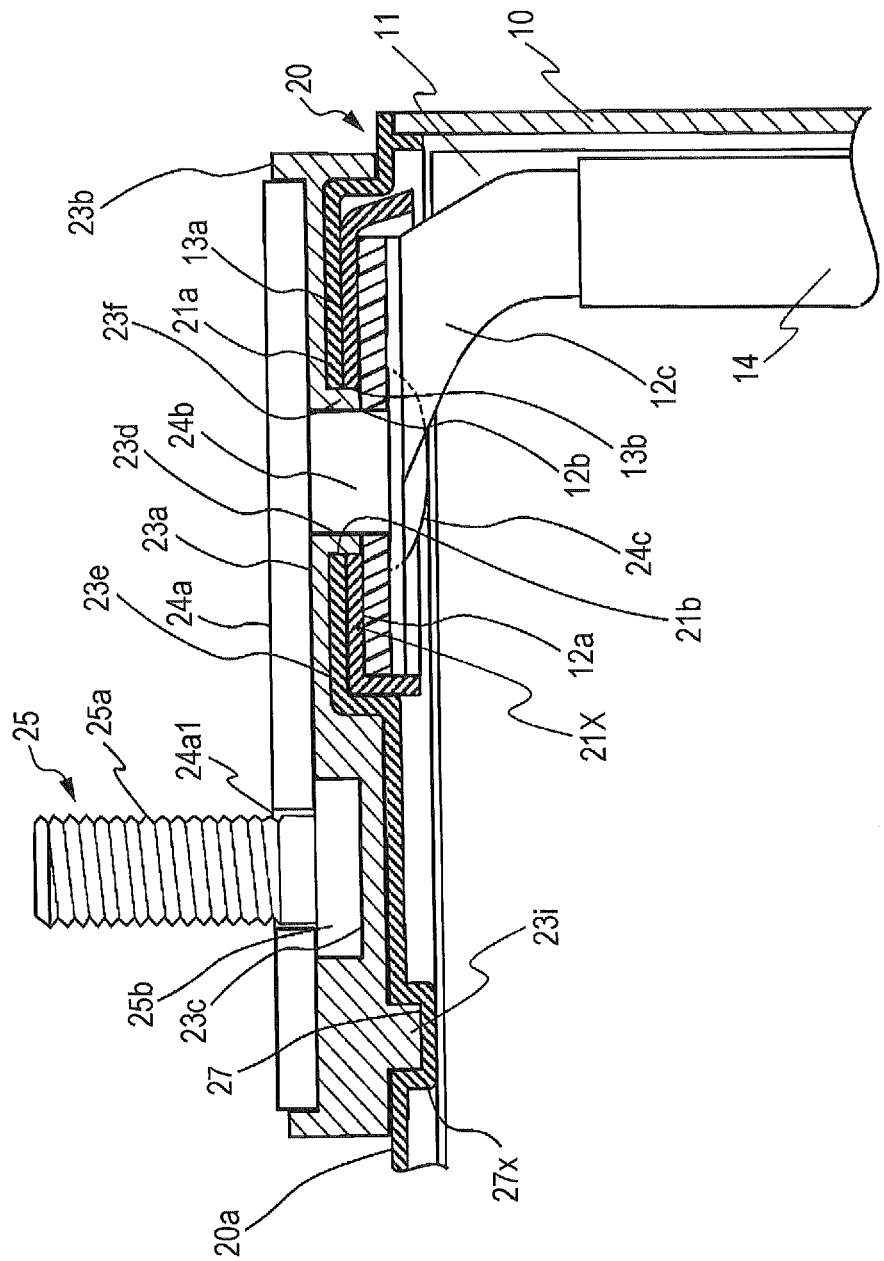
FIG. 10 is a cross-sectional view of a part illustrating another example of the configuration of the nonaqueous electrolyte secondary cell.

In the example illustrated in FIG. 10, unlike the example illustrated in FIG. 2, the surface 20a of the cover portion 20 includes a depressed part 27 instead of the convex part 22. On the other hand, the insulation sealing material 23 includes a convex part 23i corresponding to the depressed part 27 instead of the depressed part 23g. That is, in the example illustrated in FIG. 10, the plurality of fitting portions with different protruding directions (fitting directions) is disposed.

Figure 11:
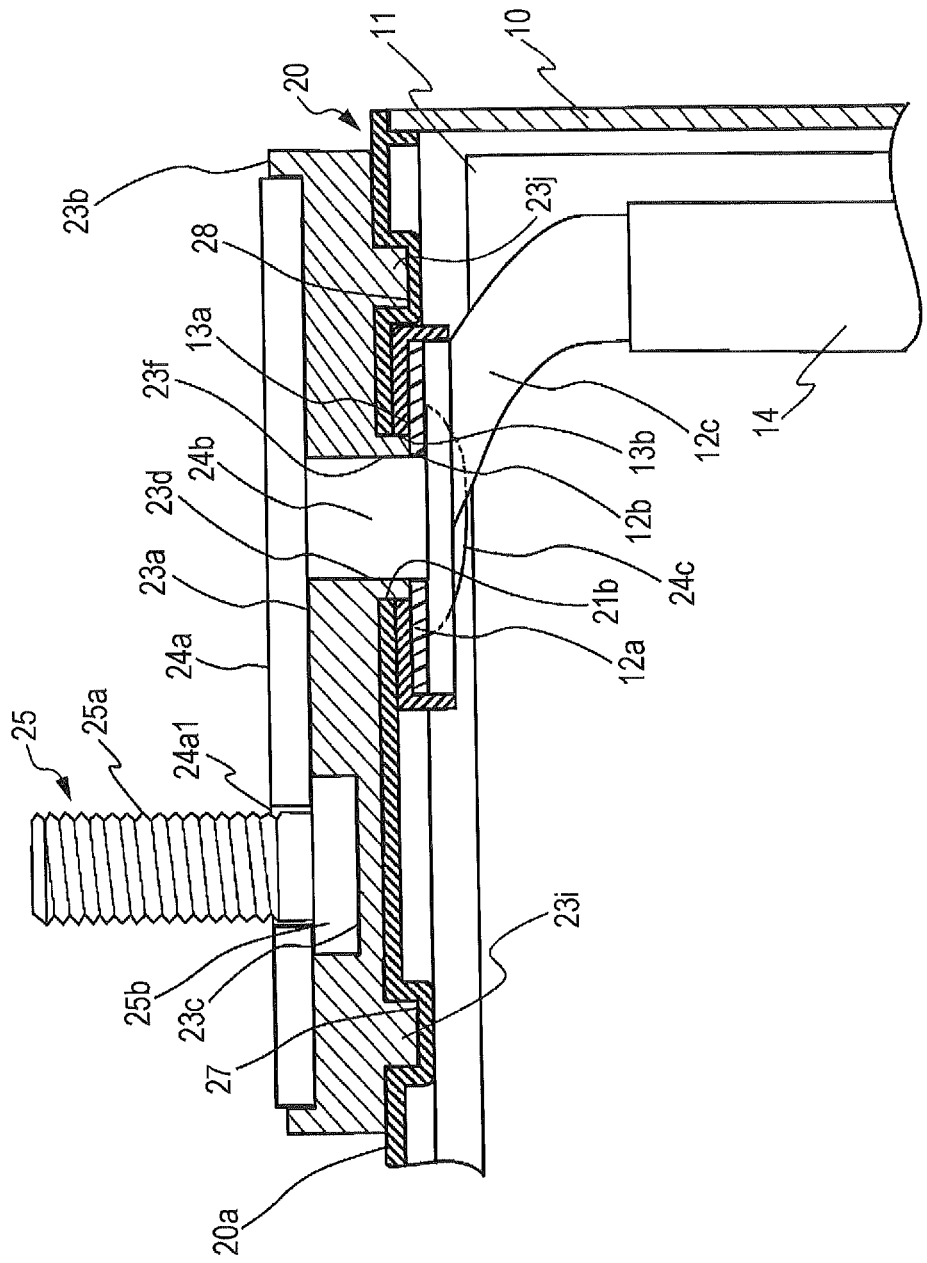
FIG. 11 is a cross-sectional view of a part illustrating another example of the configuration of the nonaqueous electrolyte secondary cell.

Additionally, in an example illustrated in FIG. 11, the cover portion 20 includes the depressed parts 27 and 28 with respect to all of the plurality of fitting portions. The current collector 12 has a surface contact with the flat backside surface of the cover portion 20. The depressed part 28 is disposed adjacent to the current collector 12. Furthermore, the insulation sealing material 23 includes two convex parts 23i and 23j corresponding to the depressed parts 27 and 28.

In the example illustrated in FIG. 11, especially, the insulation sealing material 23 includes the convex parts 23i and 23j. This allows setting a large thickness at the insulation sealing material 23 side. This increases resistance to generation of cracking or deformation during a swaging process for example.

Additionally, in this embodiment, the depressed part that forms the fitting portion of the nonaqueous electrolyte secondary cell 1 has a shape reflecting the depression on the insulation sealing material (the insulating member) 23 like the depressed part 23g or the deformation of the wall of the cover portion 20 like the depressed part 27. However, the depressed part that forms the fitting portion of the nonaqueous electrolyte secondary cell 1 may be, for example, a through-hole. In short, any configuration is possible as long as the depressed part that forms the fitting portion of the nonaqueous electrolyte secondary cell 1 fits the convex part. The depressed part is not limited by a shape of a portion that is not directly related to fitting.

In this embodiment, the electrode assembly 11 of the nonaqueous electrolyte secondary cell 1 is a wound electrode assembly. However, the electrode assembly 11 may be a laminated electrode assembly.

In this embodiment, the nonaqueous electrolyte secondary cell 1 typified by a lithium ion secondary battery has been described as an electric storage device. However, the electric storage device according to the present invention may be any battery insofar as the battery can charge and discharge by an electrochemical reaction. The electric storage device may be, for example, a nickel hydrogen battery or other various secondary batteries, or may be a primary battery. Additionally, the electric storage device may be a type of element that directly accumulates electricity as electric charge like an electric double-layer capacitor. In short, the electric storage device of the present invention may be any element that accumulates electricity. The electric storage device of the present invention is not limited by the specific method.

In this embodiment, a battery container constituted by the container main body 10 and the cover portion 20 corresponds to the housing container of the present invention. The insulation sealing material 23 and the terminal member 25 are disposed on the cover portion 20. However, the insulating member and the terminal member may be disposed at the container main body side. In short, the insulating member according to the present invention is simply constituted to be secured to the housing container at the plurality of fitting portions. Therefore, the connecting form between the cover portion and the container main body that constitute the housing container and types, shapes, the number of members that constitute the housing container are not limited.

In this embodiment, the material of the container main body 10 is aluminum. However, the material of the container main body 10 may be any other material. Therefore, the material of the container main body 10 may be, for example, aluminum alloy, stainless steel, or any other metal, or metal compound. In this embodiment, the shape of the container main body 10 has an outline in a hexahedron shape. However, the container main body 10 may have any other shape. The container main body 10 may have a shape such as a cylindrical shape, a sphere shape, a shape of an ellipsoid, any other shape with curved surfaces, or any other shape of a polyhedron. In short, the housing container according to the present invention is not limited in shape, material, or any other specific configuration.

In this embodiment, the single nonaqueous electrolyte secondary cell 1 has been described as the embodiment of the electric storage device according to the present invention. The power source module of the present invention includes a plurality of electric storage devices, and includes at least one electric storage device according to the present invention. Especially, the power source module of the present invention may be a collection of the electric storage devices according to the present invention. This configuration reduces rattling of the insulating member caused by connecting between the electric storage devices, and is preferred.

The present invention may be embodied by adding various changes to the above-described embodiment without departing from the spirit and scope of the present invention including the embodiments described above.

As described above, the present invention has an advantageous effect that stably secures the insulation structure around the conductive path in the housing container, and is effective for an electric storage device such as a secondary battery.

The embodiment of the present invention may be first to thirteenth electric storage devices and a first power source module as follows.

The first electric storage device includes a power generating element, a housing container, a connecting body, and an insulating member. The housing container houses the power generating element. The connecting body is electrically connected to the power generating element. The connecting body includes a terminal member for external connecting. The insulating member insulates a conductive path and the housing container from each other. The conductive path is formed by the power generating element and the connecting body. The connecting body is secured to the insulating member. The insulating member fits the housing container (a) in a plurality of fitting portions different from a position of the terminal member of the connecting body on the housing container or (b) in a plurality of fitting portions different from a securing position between the connecting body and the insulating member on the housing container.

According to a second electric storage device, in the first electric storage device, the plurality of fitting portions has (a) the position of the terminal member of the connecting body or (b) the securing position between the connecting body and the insulating member at least on the housing container as an origin. The plurality of fitting portions is dispersed (i) on quadrants positioned in a diagonal relationship or (ii) on a coordinate axis to sandwich the origin in an orthogonal coordinate set by any rotation angle around the origin. According to a third electric storage device, in the second electric storage device, (a) in a case where the origin is the position of the terminal member of the connecting body on the housing container, (b) the securing position between the connecting body and the insulating member is included in any of the plurality of fitting portions.

According to a fourth electric storage device, in the second or third electric storage device, a distance from at least one of the plurality of fitting portions to the origin is different from a distance between another of the plurality of fitting portions to the origin. According to a fifth electric storage device, in the fourth electric storage device, a fitting portion with a larger distance from the origin has a larger outside dimension among the one fitting portion and the other fitting portion in the plurality of fitting portions. According to a sixth electric storage device, in the fifth electric storage device, on a principal surface of the housing container where the insulating member is positioned, a distance between the origin and the fitting portion positioned at an outer edge side of the principal surface is larger than a distance between the origin and the fitting portion positioned at a center side of the principal surface.

According to a seventh electric storage device, in any one of the second to sixth electric storage devices, (a) the position of the terminal member of the connecting body or (b) the securing position between the connecting body and the insulating member, and the plurality of fitting portions are arranged on a same straight line. According to an eighth electric storage device, in any one of the second to seventh electric storage device, at least one planar shape of the plurality of fitting portions on a surface of the housing container is a flat figure that has a longitudinal direction in a direction along a radial direction around the origin.

According to a ninth electric storage device, in any one of the second to eighth electric storage devices, the connecting body further includes a relay member. The relay member is connected to a current collector connected to the power generating element inside of the housing container. The relay member passes through a wall of the housing container to be connected to the current collector. The terminal member is connected to the relay member. The terminal member is disposed on the insulating member while being exposed on a surface of the housing container. According to a tenth electric storage device, in the ninth electric storage device, the terminal member includes a shaft-like terminal main body that protrudes from the surface of the housing container, and (a) the position of the terminal member of the connecting body is a position of the terminal main body.

According to an eleventh electric storage device, in the ninth electric storage device, the terminal member includes a shaft-like terminal main body along the surface of the housing container. The relay member includes a shaft-like relay rod connected to the current collector at one end. The relay member is integrated with the terminal member. (b) The securing position between the connecting body and the insulating member is a position of the relay rod. A twelfth electric storage device, in any one of the first to eleventh electric storage devices, includes a convex part and a depressed part. The convex part is formed on a surface of the housing container. The depressed part is formed on a surface facing the convex part of the housing container in the insulating member. The depressed part has a shape corresponding to the convex part. At least one of the plurality of fitting portions is formed by fitting of the convex part of the housing container and the depressed part of the insulating member.

A thirteenth electric storage device, in any one of the first to twelfth electric storage devices, includes a depressed part and a convex part. The depressed part is formed on a surface of the housing container. The convex part is formed on a surface facing the depressed part of the housing container in the insulating member. The convex part has a shape corresponding to the depressed part. At least one of the plurality of fitting portions is formed by fitting of the depressed part of the housing container and the convex part of the insulating member. A first power source module includes at least one of the first to thirteenth electric storage devices.

What is claimed is:

1. An electric storage device, comprising:
    a power generating element;
    a housing container that houses the power generating element;
    a connecting body electrically connected to the power generating element; and
    an insulating member that fits the housing container at a plurality of fitting portions, secures the connecting body, and insulates a conductive path, which includes the power generating element and the connecting body, and the housing container from each other,
    wherein the insulating member comprises a bottom surface that includes a plurality of depressed parts that are fitted to the housing container at the plurality of fitting portions, respectively, and the plurality of depressed parts formed in the bottom surface are substantially aligned in a lengthwise direction of the insulating member.

2. The electric storage device according to claim 1, wherein
    the connecting body includes a terminal member for external connecting, and
    respective positions of the plurality of fitting portions in the insulating member are different from a securing position of the terminal member in the insulating member.

3. The electric storage device according to claim 2, wherein
    the plurality of fitting portions includes a first fitting portion and a second fitting portion, and
    a distance from the first fitting portion to the securing position of the terminal member is longer than a distance from the second fitting portion to the securing position of the terminal member.

4. The electric storage device according to claim 3, wherein
    an outside dimension of the first fitting portion is larger than an outside dimension of the second fitting portion.

5. The electric storage device according to claim 4, wherein
    the first fitting portion is positioned at an outer edge side with respect to the securing position of the terminal member, and
    the second fitting portion is positioned at a center side with respect to the securing position of the terminal member.

6. The electric storage device according to claim 2, wherein
    the plurality of fitting portions includes a fitting portion that has a flat planar shape, the planar shape having a longitudinal direction in a direction toward the securing position of the terminal member.

7. The electric storage device according to claim 2, further comprising
    a current collector connected to the power generating element inside of the housing container, wherein
    the connecting body further includes a relay member passing through a wall of the housing container to be connected to the current collector,
    the terminal member is connected to the relay member and includes a shaft-like terminal main body, the terminal member being disposed on the insulating member while being exposed on a surface of the housing container, and
    the securing position of the terminal member is a position of the terminal main body.

8. The electric storage device according to claim 2, further comprising
    a current collector connected to the power generating element inside of the housing container, wherein
    the connecting body further includes a relay member passing through a wall of the housing container to be connected to the current collector,
    the terminal member is connected to the relay member and includes a terminal main body in a plate shape along a surface of the housing container, the terminal main body being disposed on the insulating member while being exposed on a surface of the housing container,
    the relay member includes a shaft-like relay rod connected to the current collector at one end, the relay member being integrated with the terminal member, and
    the securing position of the terminal member is a position of the relay rod.

9. The electric storage device according to claim 1, further comprising
    a current collector connected to the power generating element inside of the housing container, wherein
    the connecting body further includes a relay member passing through a wall of the housing container to be connected to the current collector, and
    the respective positions of the plurality of fitting portions are different from a connecting point between the relay member and the current collector.

10. The electric storage device according to claim 1, further comprising:
    a convex part formed on a surface of the housing container,
    wherein a depressed part of the plurality of depressed parts is formed on a surface of the insulating member facing the convex part of the housing container, the depressed part having a shape corresponding to the convex part, and
    wherein at least one of the plurality of fitting portions is formed by fitting of the convex part of the housing container and the depressed part of the insulating member.

11. The electric storage device according to claim 1, further comprising:
    a depressed part formed on a surface of the housing container; and
    a convex part formed on a surface facing the depressed part of the housing container in the insulating member, the convex part having a shape corresponding to the depressed part, wherein at least one of the plurality of fitting portions is formed by fitting of the depressed part of the housing container and the convex part of the insulating member.

12. The electric storage device according to claim 1, wherein the insulating member comprises a through hole, and the plurality of depressed parts comprises a portion formed around the through hole.

13. The electric storage device according to claim 1, wherein the insulating member comprises a through hole, and a pair of long sides and a pair of short sides connecting the pair of long sides, respectively, and
wherein a depressed part of the plurality depressed parts comprises a first portion formed between the through hole and a first short side of the pair of short sides.

14. The electric storage device according to claim 13, wherein the depressed part further comprises a second portion formed between the through hole and a second short side of the pair of short sides.

15. The electric storage device according to claim 1, wherein the housing container comprises a container main body and a cover portion formed on the container main body, and
wherein the cover portion comprises a plurality of convex portions which are fitted into the plurality of depressed parts to form the plurality of fitting portions, respectively.

16. The electric storage device according to claim 15, wherein the cover portion comprises a through hole and the plurality of convex portions comprises a portion formed around the through hole.

17. An electric storage device, comprising:
a power generating element;
a housing container that houses the power generating element;
a connecting body electrically connected to the power generating element; and
an insulating member that fits the housing container at a plurality of fitting portions, secures the connecting body, and insulates a conductive path, which includes the power generating element and the connecting body, and the housing container from each other,
wherein the connecting body includes a terminal member for external connecting,
wherein respective positions of the plurality of fitting portions in the insulating member are different from a securing position of the terminal member in the insulating member, and
wherein the plurality of fitting portions is dispersed on quadrants positioned in a diagonal relationship in an orthogonal coordinate where the securing position of the terminal member is an origin.

18. An electric storage device, comprising:
a power generating element;
a housing container that houses the power generating element;
a connecting body electrically connected to the power generating element; and
an insulating member that fits the housing container at a plurality of fitting portions, secures the connecting body, and insulates a conductive path, which includes the power generating element and the connecting body, and the housing container from each other,
wherein the connecting body includes a terminal member for external connecting,
wherein respective positions of the plurality of fitting portions in the insulating member are different from a securing position of the terminal member in the insulating member, and
wherein the plurality of fitting portions is dispersed on one coordinate axis in an orthogonal coordinate where the securing position of the terminal member is an origin, the plurality of fitting portions sandwiching the origin.

19. An electric storage device, comprising:
a power generating element;
a housing container that houses the power generating element;
a connecting body electrically connected to the power generating element; and
an insulating member that fits the housing container at a plurality of fitting portions, secures the connecting body, and insulates a conductive path, which includes the power generating element and the connecting body, and the housing container from each other,
wherein the connecting body includes a terminal member for external connecting,
wherein respective positions of the plurality of fitting portions in the insulating member are different from a securing position of the terminal member in the insulating member, and
wherein the plurality of fitting portions includes two fitting portions that form an angle with the securing position of the terminal member, the angle being within a range from 90° to 180°.

20. A power source module, comprising
at least one electric storage device according to claim 1.

* * * * *